United States Patent [19]

Kuntz et al.

[11] 4,097,690
[45] Jun. 27, 1978

[54] INTERCOMMUNICATION AND ALARM TELEPHONE SYSTEM

[75] Inventors: Donald L. Kuntz, Wayne, Ill.; David Kent, Palm Harbor, Fla.

[73] Assignee: Precision Components Inc., Addison, Ill.

[21] Appl. No.: 739,189

[22] Filed: Nov. 5, 1976

[51] Int. Cl.² .......................................... H04M 11/00
[52] U.S. Cl. ...................... 179/2 A; 179/5 R; 179/1 H
[58] Field of Search .............. 179/99, 18 AD, 15 AL, 179/15 AT, 1 H, 1 CN, 2 R, 2 A, 5 R, 17 B, 17 A, 18 BC, 37, 15 BS, 15 BY

[56] References Cited
U.S. PATENT DOCUMENTS

| | | | |
|---|---|---|---|
| 3,842,208 | 10/1974 | Paraskevakos | 179/5 R |
| 3,936,602 | 2/1976 | Korver | 179/15 BS |
| 4,022,985 | 5/1977 | Tanaka | 179/99 |
| 4,027,110 | 5/1977 | Takematsu | 179/99 |

Primary Examiner—Kathleen H. Claffy
Assistant Examiner—Joseph A. Popek
Attorney, Agent, or Firm—Charles A. Laff; J. Warren Whitesel; Howard B. Rockman

[57] ABSTRACT

An intercommunication and alarm telephone system has a common control in the form of a clock driven central unit connected to an alarm control unit and one telephone line shared by a plurality of station units. The central control unit provides means for answering and placing outside telephone calls to a central telephone office, holding and transferring such calls, giving paging and intercom services, excluding and locking out other stations from outside calls, giving suitable alarms, and such other services as may be necessary or desirable.

14 Claims, 5 Drawing Figures

DATA STREAM

FIG.2

INTERCOMMUNICATION AND ALARM TELEPHONE SYSTEM

This invention relates to private telephone systems and more particularly to telephone and intercommunication systems especially — although not exclusively — well adapted for home or residential use.

A private telephone system is usually called either a "PBX" or "PAX", depending upon whether it is or is not a branch (PBX) of a central telephone office. An auxiliary system (PAX) is independent of the central office. Most PBX's and PAX's are fairly large, relative to the capacity required by a home, very small office, or the like.

An intercommunication system ("intercom") is a small system, usually involving a loud speaker, which lacks privacy. Therefore, it is not possible to carry on a private conversation via most intercoms. Even when the intercom includes an associated hand set, which may be used to eliminate the loudspeaker, it is usually possible for others to listen in by picking up a similar telephone hand set.

An alarm system is one which gives a distinctive signal responsive to special conditions. For example, a smoke alarm sounds a warning when a fire occurs, a door bell rings in a distinctive manner depending upon whether signaled from a front door or a back door, a burglar alarm sounds when there is an unauthorized entry, and a baby sitter system broadcasts the sound of a baby's cry. Usually, each of these alarm and similar system is totally separate from the others, each requiring its own power supply and similar common equipment, thereby tending to create a jungle of unrelated wires and components, and a needless duplication of common equipment.

A home, residence, small business establishment or the like (hereinafter called "home system") has a need for the services of each of these systems. Heretofore, no one home system has been able to serve all of the home owner's needs, without simultaneously becoming so massive or expensive as to be prohibitive to the mass market of home owners.

Accordingly, an object of the invention is to provide new and improved home telephone, intercommunication and alarm systems. Here, an object is to provide a home system at such a low cost that it may be made available to all who wish to use it.

Another object of the invention is to provide means for placing and answering calls to and from a central telephone office at any one of many stations in a home system. Here, an object is to provide means for paging, call transfer, privacy exclusion on outside calls, and outside call holding at each home station. In this connection, an object is also to provide complete supervision at most, if not all, home stations for giving a continuous indication of the busy or idle status of the various circuits.

Still another object of the invention is to provide all of the foregoing functions without requiring an undue amount of excess wiring, as compared to the amount of wiring otherwise required for installation of telephone stations. Yet another object of the invention is to provide a number of optional features which may be used with the inventive systems. Here, an object is to provide for selective signaling responsive to any of several, different alarms such as smoke alarms, door bells, burglar alarms, and the like.

In keeping with an aspect of the invention, these and other objects are accomplished by a system using a clock driven central control unit which is connected between a telephone line extending to a central office and a telephone line extending to one or more telephone stations. The control unit provides a common means for answering and placing outside telephone calls, holding and transferring calls, giving paging and intercom services, excluding and locking out other stations from outside calls, and giving suitable alarms.

More particularly, the inventive home system provides a total intrahome communications system, which may function as a normal telephone connected to a central office to to a selective signaling intercom system. The system is compatible with both standard rotary and multifrequency push button dialing phones. Fire and intrusion alarm sensing devices, and front and rear doorbells may also be terminated into the home system. Speakers may be placed at one or more exterior doors and terminated into the home system for enabling two-way voic-switched communications from any station unit to the door speaker. The same station units are used as the audible signaling devices for all of these systems. A remote alarm reporting system and a standby battery power source may also be provided. If there is an external power failure and if standby battery power source is not used, all local telephone instruments are connected through to the associated central office until power is restored.

The nature of a preferred embodiment of the invention may become more apparent from a study of the attached drawings, wherein.

Figure 1:
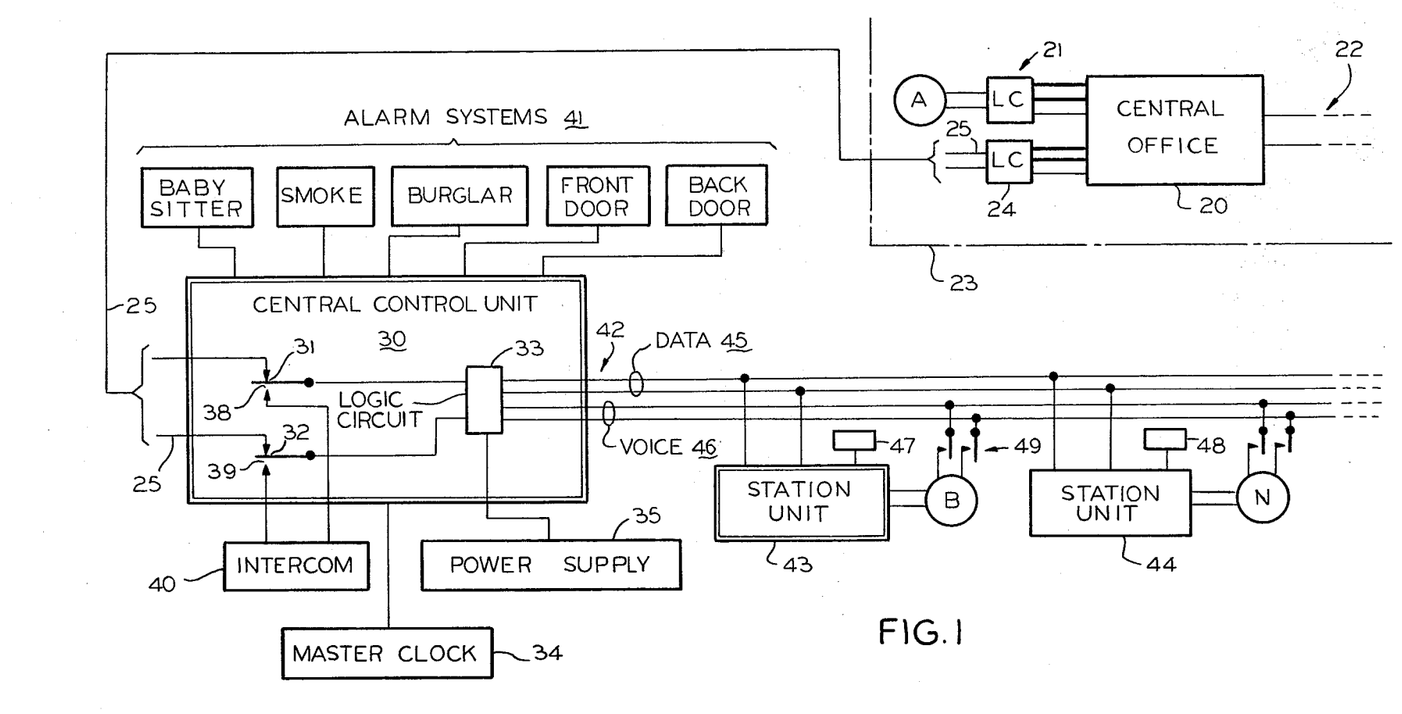
FIG. 1 is a block diagram of a home system.

In FIG. 1, a public utility type of telephone system 20 is shown as having line circuits 21 connected to one side and trunk circuits 22 connected to the other side. The inventive home system is shown to the left, and below, a dot-dash line 23. This home system connects directly into one conventional subscriber line circuits, as at 24 in the public utility system 20.

A conventional telephone line 25 is connected between line circuit 24 and central control unit 30, at the home station. There, the line 25 extends through relay contacts 31, 32 to a logic control circuit 33, which is able to process commands under control of pulses from a master clock 34. The home system uses its own power supply 35 at all times, except when there is an external power failure, in which case the home system is configured so that local station telephones are connected directly to the central office battery. All locally supplied power for the home system is supplied from the central unit 30, so that there is no need for a local external power supply at any of the station units.

At contacts 38, 39, an intercom system 40 may be substituted for the central office 20 when the home system is placed in a condition to function independently of the central office. In addition, any one of many different alarm systems 41 may also be interconnected with the system in order to give any of the services noted in FIG. 1, or the like.

Connected to the central unit 30 via standard four wire telephone cable 42 is a plurality of station units 43, 44. Each station unit is connected to an associated telephone instrument "B"... "N", which may be of conventional design. The station unit is controlled from the logic circuitry 33, responsive to signals sent over a first pair of the four wires, here called the "data" line 45. The voice signals are transmitted over a second or voice pair of the four wires, here called the "voice" line 46. When any of the station units 43, 44 are activated, an individually associated relay 47, 48 closes a pair of contacts (as at 49) and connects the associated telephone instrument B to the voice line 46. An advantage of the inventive home system is that virtually all wiring for home telephones includes an "inside" wiring cable, which has four wires, even though frequently only two of them are actually used. Therefore, the inventive system does not require any unusual wiring.

Figure 2:
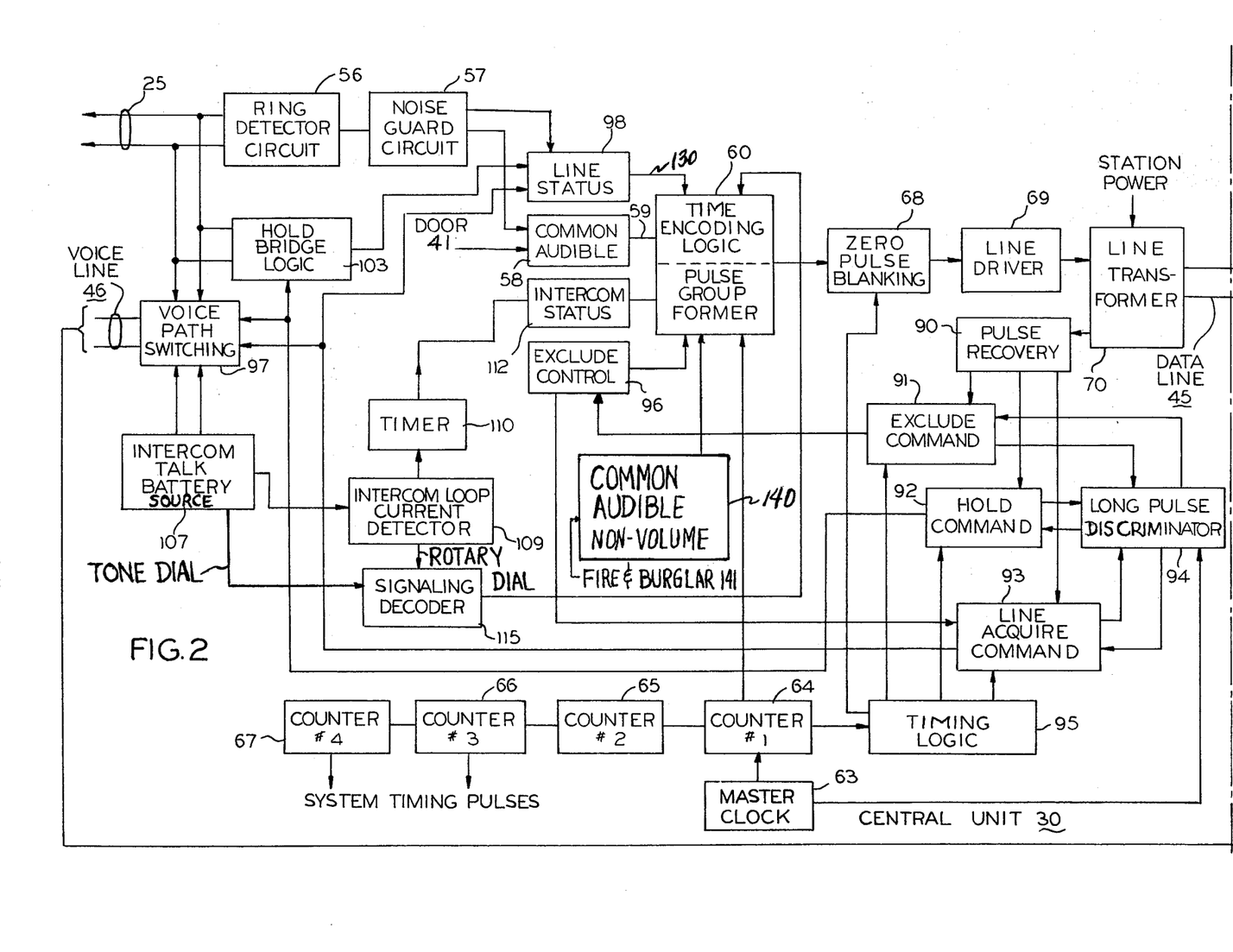
FIG. 2 is a block diagram of a central unit for furnishing a clock driven common control circuit for the home system.
Figures 3, 4:
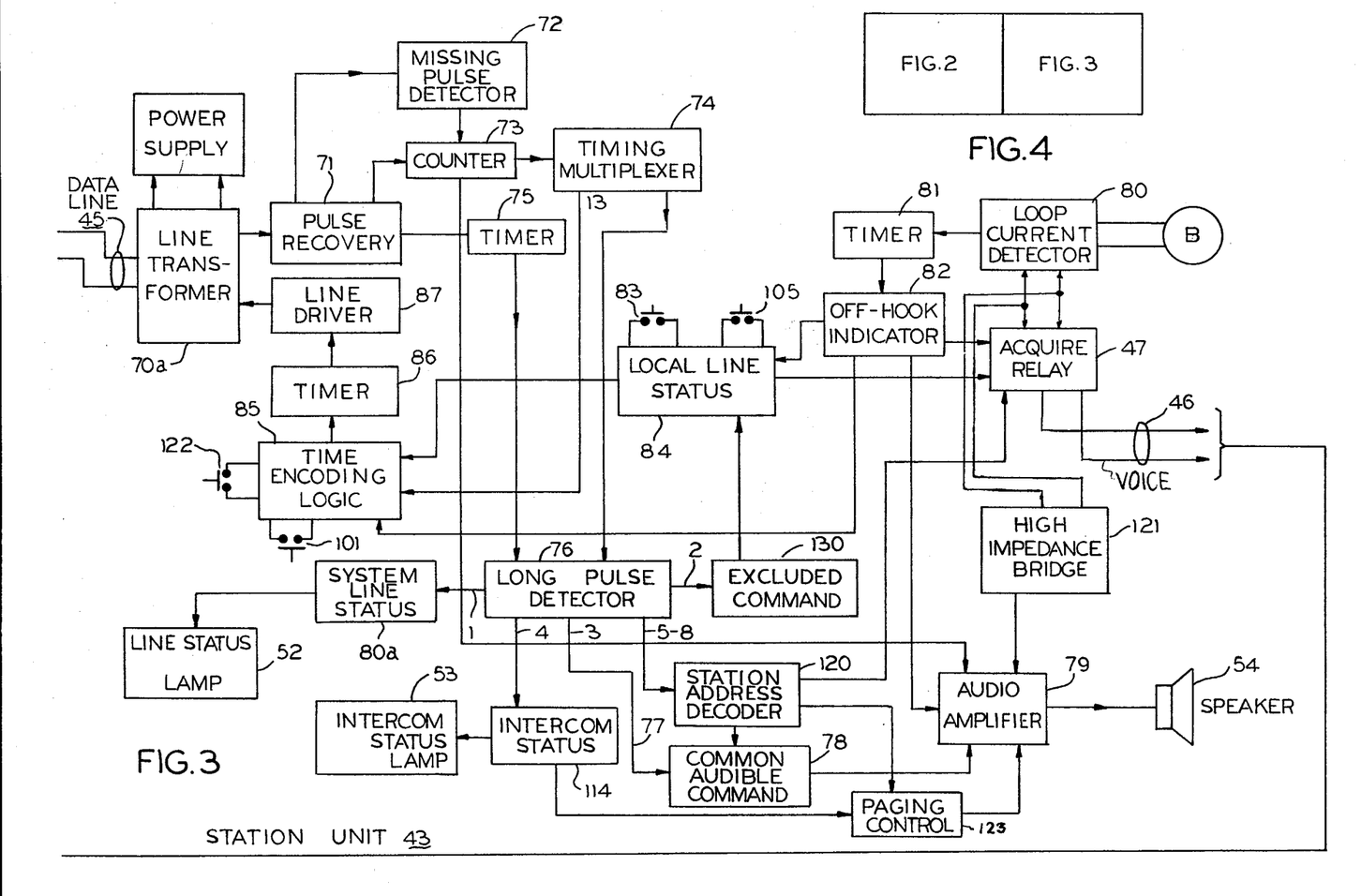
FIG. 3 is a block diagram of a station unit for use in the home system.
FIG. 4 shows how FIGS. 2 and 3 should be arranged and connected to disclose a complete system.

The nature of the central control unit 30 and a station unit 43 may be understood best from a study of FIGS. 2, 3 when joined in the manner shown in FIG. 4. The telephone line 25, to the central office 20, is found in the upper left-hand corner of FIG. 2. The voice line 46 is found just beneath line 25. The data line 45 interconnects FIGS. 2 and 3. The telephone instrument B is seen in the upper right-hand corner of FIG. 3.

The central unit 30 continuously updates each station unit (FIG. 3) on the status of all stations in the home system, by means of signals sent over the data line 45. Interunit data transmission utilizes a data pulse stream shown in FIG. 5, which incorporates a distinctive modulation of individual pulses, here pulse width modulation. However, it should be understood that other forms of modulation may also be used. Between the central and station units, pulses are continuously transmitted, in groups which repeat cyclically. Each pulse group in the data stream consists of sixteen separate data pulses, each pulse having a position within the group which determines the command that it represents. Here, the width of each pulse determines whether that command is active or not active (i.e., a wide pulse means that the command represented by the pulse position should be executed). The first thirteen pulses of each group are transmitted from the central unit to the stations and the last three pulses are transmitted from the stations to the central unit.

The pulse positions may have the following significance:

| Pulse Number | Significance |
| --- | --- |
| 0 | System Timing |
| 1 | Line Status |
| 2 | Excluded |
| 3 | Common Audible Signals Coupled Through Volume Control |
| 4 | Intercom Status |
| 5 through 8 | Intercom Station Address |
| 9 | Common Audible Signals Bypassing Volume Control |
| 10 | Door, Fire & Burglar Alarm Status |
| 11 | (Reserved for New Equipment) |
| 12 | Internal Timing (Central Unit) |
| 13 | Line Status |
| 14 | Hold |
| 15 | Exclude |

The pulse position nine (common audible signal not under volume control), of each pulse group in the data stream causes common audible signals from the fire and intrusion alarms to remain at full volume and maximum effectiveness, independent of the setting of the station volume control. All other station signaling tones originated by the doorbell alarm, incoming ringing detector or intersection dialing encoder have a controllable volume.

In an idle condition, all pulses within a pulse group are of equal, short widths. When a command is made, the pulse corresponding to that command is lengthened. Other units of the system recognize this pulse lengthening and execute the corresponding command.

Each station unit 43 (FIG. 3) has the ability to transmit four commands to the central unit, which are: (1) seize central office line circuit; (2) place central office line on hold; (3) exclude all other stations from central office line connection; and (4) seize the intercom line circuit. The status of the system is displayed by means of two status lamps 52, 53 at each station unit. Each station unit also contains a paging loud speaker 54, which is used to broadcast voice signals for area paging and audible tones for station signaling.

The first call sequence to be described is one which is incoming over line 25, from the central office 20. The line 25 is seized and ringing voltage is transmitted from the central office 20, in a conventional manner. Responsive thereto, a ringing voltage detector 46 responds and generates a suitable locally usable signal which it forwards through a noise guard circuit 57 that protects against response to either noise on the line or randomly occurring frequencies which simulate ringing frequencies. If the noise guard circuit 57 evaluates the ringing signal as a valid one, the common audible circuit 58 and the line status circuit 98 are triggered. Responsive thereto, inputs 59 and 130 are marked in a time encoding logic circuit 60. (If the "call" is from one of the door sensors 41 (FIG. 1), a similar common audible signal triggering occurs via an input (FIG. 2) to the common audible circuit 58).

The master clock 63 supplies a continuous stream of clock pulses (FIG. 5) which are counted by each of four counters 64–67, to provide a data stream of program clock pulses. The output of the #1 counter 64 causes encoding logic circuit 60 to lengthen every third pulse, periodically. (By way of example, FIG. 5 has been drawn to show such a lengthening of each third and thirteenth pulse in the data stream of pulses.) Also, the first pulse will be lengthened periodically by the input from the line status circuit 98 to the encoding logic circuit 60 so that an intermittent or flashing lamp signal may be sent to the station units.

Figure 5:
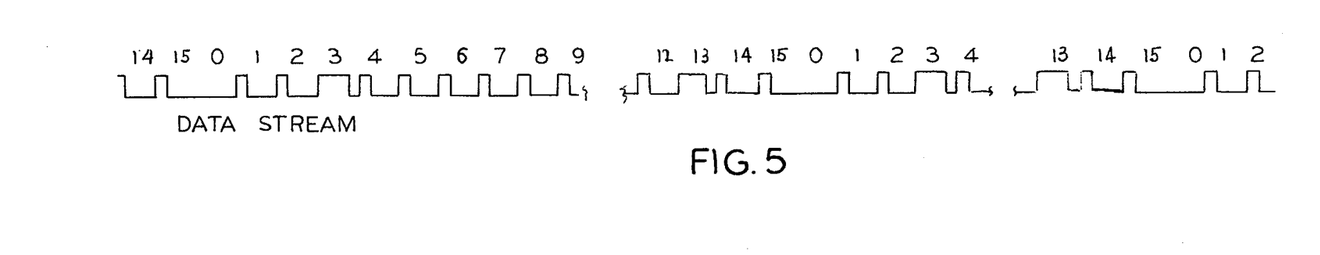
FIG. 5 is a wave form showing a possible data stream for controlling the home system.

The output of logic circuit 60 is sent through a zero pulse blanking circuit 68 which deletes the "0" pulse from the data pulse stream (FIG. 5), in order to provide synchronization for system timing. Thus, the data stream of pulses depicted in FIG. 5 is sent (without a zero pulse) through line driver 69 (an amplifier) and line transformer 70 over data line 45 to each station unit (FIG. 3), and its line transformer 70a to pulse recovery circuit 71. Pulse recovery circuit 71 reshapes each of the pulses to insure their usability in the subsequent logic circuitry. The missing pulse detector 72 responds to the blanked zero pulse, in order to synchronize the timing of the station unit 43 with the central unit 30 timing. Responsive to this synchronism, a counter 73 transmits distinctive local pulses through the station unit at predetermined counts, in order to coordinate local responses within the station unit 43.

The output of the counter 73 is fed into a timing multiplexer 74, which recovers the pulse position significance from the stream of pulses.

A coordination of a pulse timer 75 and the timing multiplexer 74 causes a long pulse detector 76 to respond to the periodically wide third pulse, which was lengthened by the time encoding logic circuit 60 in the central unit 30. The pulse position responded to by the long pulse detector 76 is indicated by numbers near its output terminals. Thus, by inspection, wire 77 is marked during the periods when third or ninth pulses are wide or long. Responsive thereto, a common audible command circuit 78 transmits an enable signal to audio amplifier 79. As a local ringing signal, an interrupted 1000 Hz signal is transmitted from audio amplifier circuit 79 through speaker 54.

The lengthened first pulses are fed through line status circuit 80a to cause line status lamp 52 to light. Since the first pulses are lengthened periodically, the line status lamp 52 is flashed to show the unanswered condition.

The subscriber at station B, who hears the signaling tone and sees the flashing lamp, removes a hand set from the telephone instrument associated with the station to answer the call. This removal closes a set of hook switches (not shown) in the telephone instrument to complete a local loop to loop current detector 80. Subsequently, the subscriber at station B presses a "line acquire" push button 83 located on the station unit 43. Operation of push button 83 causes the acquire relay 47 to operate, closing contacts 49 (FIG. 1) and connecting station B to voice line 46. With a current path now completed by operation of the acquire relay 47, the local loop current detector 80 senses the presence of loop current, starting a timing circuit 81 and energizing an off-hook indicating circuit 82.

Operation of push button 83 also energizes the upper input of a local time encoding logic circuit 85. The timing multiplexer 74, in conjunction with the time encoding logic circuit 85 causes the thirteenth pulse in each pulse group of the data pulse stream to be active while a call is in progress. Circuit 85 lengthens the thirteenth data pulse and feeds it to a timer circuit 86 and to line driver circuit 87. The lengthened thirteenth pulse is applied through line transformer 70a and transmitted over data line 45 to the central unit 30.

At the central unit 30, the stream of data pulses incoming from the station units are applied from the line transformer 70 to a pulse recovery circuit 90 where the pulses are shaped and reconverted to logic signal levels. They are simultaneously passed to an exclude command circuit 91, a hold command circuit 92 and a line acquire command circuit 93. Each of these three circuits 91-93 holds two-way communication with a long pulse discrimination circuit 94. If a long pulse is present, it leads to an execute command signal being transmitted from circuit 94 to circuits 91-93 in common. The timing logic circuit 95 (driven from master clock 63 and counter 64) in conjunction with the long pulse discrimination circuit 94 causes only the line acquire command circuit 93 to respond to the lengthened thirteenth data pulse. Receipt of this command causes the voice path switching relay 97 to release, thereby connecting the station path line 46 to the central office line 25. This completes the connection between the station telephone instrument B and the central office 20. The line acquire command signal also causes the line status circuit 98 to lengthen the first pulse in each pulse group of the data stream. This modified pulse stream is continuously sent out to every station unit 43, 44, . . . connected to line 42 (FIG. 1).

In the station units, a long first pulse is recognized as a central office line "in use" signal by the system line status control circuit 80a as outlined previously. The line status lamp 52 is lit continuously at all stations, indicating that the central office line 25 is in use.

The continued flow of loop current through the loop current detector 80 in the station unit 43 causes the thirteenth data pulse of each pulse group in the data stream to remain long after the acquire line button 83 is released for as long as the loop current remains present. This long pulse is maintained responsive to inputs from the loop current detector 80, timer 81, off-hook indicating circuit 82, and the local line status circuit 84. In this manner, the station units continuously update the central unit 30 on the idle or busy status of the central office line 25.

Means are provided for holding the central office line connection if it should be necessary for station B to go on hook before the end of the call, as to transfer a call, for example. In greater detail, to place the central office on hold, the user depressed hold button 101 in station unit 43 (FIG. 3). Responsive thereto, time encoding logic circuit 85, in the station unit 43, lengthens the fourteenth pulse of each pulse group in the data stream. This elongated pulse is transmitted to, and decoded by the central unit 30, in a manner which is identical to the decoding of the line acquire signal. However, in this sequence, the timing logic causes the hold command circuit 92 to respond to the long fourteenth pulse. Responding thereto, the central unit 30 hold command circuit 92 causes a holding bridge 103 to be placed across the tip and ring of the central office line 25, to hold the central office line circuit 24 busy (FIG. 1). The voice path switching relay 97 (FIG. 2) also operates, opening the connection between the station voice line 46, and hence, the station telephone set B, and the central office line 25.

When the connection between the voice line 46 and the central office line 25 is opened, loop current ceases to flow to the station unit 43, which is detected by the loop current detector 80. Loop current detector 80 allows timer 81 to time out, allowing the off-hook indicator circuit 82 to become idle. This causes the acquire relay 47 to operate (FIG. 1), opening the path between station B and the voice line 46 leading to the central unit 30. The thirteenth data pulse of each pulse group in the data stream also returns to an idle or short length, under control of the off-hook indicator circuit 82 and the local line status circuit 84. When the central unit 30 detects that the thirteenth data pulse is a short length, the line acquire command circuit 93 is reset and no longer held busy. Consequently, the line status circuit 98 is placed under the sole control of the hold bridge and logic circuit 103. The first pulse of each pulse group in the data stream is then lengthened periodically at a duty cycle of approximately 25% to flash the line status lamps 52 at all stations to indicate that the central office line 24 is on hold.

Means are provided for enabling a local station to seize the intercom and page or otherwise call another local station. More particularly, to seize the intercom line circuit, the user at station B remains off-hook and depresses the acquire intercom button 105 (FIG. 3), causing the acquire relay 47 to release. The telephone set associated with station B is now connected through the loop current detection circuit 80 via voice line 46 to the central unit 30. The voice path switching relay 97 in the central unit has been operated and is being held at this time; therefore, the release of the acquire relay 47 completes a voice and current path from station B to the intercom talk battery source 107. The resulting loop circuit is detected by the loop current detector 80 in the station unit 43 and by the intercom loop current detector 109 in the central unit 30.

The loop current detector 80 in the station unit 43, acting through the timer 81 and off-hook indicator circuit 82, causes the acquire relay to remain released as long as loop current is detected. The period of the timer circuit 81 is long enough to prevent a disconnection of the intercom circuit during normal pulse dialing interruptions of loop current.

The intercom loop current detector 109 in the central unit 30 causes an intercom busy indication to be sent through timer 110 to the intercom status control logic circuit 112. The timer 110 prevents false intercom busy signals, due to noise or switching transients. The intercom status control logic circuit 112 causes the fourth data pulse of each pulse group in the data stream to be lengthened and transmitted to all station units. This long fourth pulse is recognized in the station units 43 by the intercom status logic circuits 114. The intercom status lamps 53 are then lit continuously at all station units, thus indicating that the intercom circuit is in use.

Means are provided for recognizing and responding to dialing information. If either a rotary or a multifrequency push button dial is used, a similar sequence is followed. However, since both rotary dial pulses and push button dial tone detection are known, it is thought that there is no need to describe both of them in detail; therefore, the following comments are directed to the rotary dial. Each station unit 43 in the system is identified by unique digits, here assumed to be a single identifying digit.

To call another station unit, say station C, the calling party dials the single digit code assigned to the called station. The dial of the telephone instrument at station B interrupts the loop current supplied by the intercom talk battery source 107 in the central unit 30. These interruptions are detected by the intercom loop current detector 109 and sent to the signaling decoder 115. Afer dialing has been completed, the signaling decoder 115 processes the information and passes it onto the time encoding logic/pulse group former circuit 60. The dialed station number, converted into a binary coded decimal format by the signaling decoder 115, is encoded into data pulse positions five (least significant bit) through eight (most significant bit) of the data stream by the time encoding logic circuit 60.

The dial pulse data is subsequently sent to all station units via data line 45. Each of the station units (FIG. 3) processes this dialed information through circuits 70a, 71, 73, 74, 75, 76, and 120. The station address decoding circuit 120 is activated in the particular called station unit C equipped to identify the same station code that is encoded in pulse positions 5 through 8. As the intercom status circuit 114 will be indicating that the intercom is seized, in the station unit where the address decoder circuit 120 identifies a proper local station code during pulse positions 5 through 8, there is an AND function of these two active circuits, to trigger a paging control circuit 123. Triggering the paging control circuit 123 causes the audio amplifier circuit 79 to be enabled.

Subsequently, the address decoder circuit 120 triggers the common audible command circuit 78 briefly, thereby applying a locally generated 1000 Hz (approximately) tone burst to audio amplifier 79. Responsive thereto, this tone burst is broadcast by the speaker 54, as a signal indicating that the station broadcasting the tone has been called. Furthermore, the activated address decoding circuit 120 causes the acquire relay 47 at that station to release. In conjunction with the intercom status logic circuit 114 and the high impedance bridge circuit 121 now across the voice line 46, the loud speaker 54 is also arranged as a paging speaker. This enables the calling party to broadcast information through the called station C, without requiring the called station to answer.

The called party at station C answers an intercom call by placing his station in an off-hook condition. The telephone instrument C is connected via the loop current detection circuit 80 and released acquire relay 47 to the voice line 46. Since the voice line 46 is common to all station units as well as to the central unit, the calling and called parties are now connected together and may converse normally.

During intercom operation, the central unit 30 is sensitive only to the presence or absence of intercom loop current via the intercom loop current detector circuit 109. Therefore, since loop current is already present when the system is busy due to one telephone instrument B being across voice line 46. A seizure of the intercom line circuit by a second station unit C . . . N has no effect on the central unit 30. In the called station unit, the loop current detector 80 operates timer 81 and off-hook indicator circuits 82 to cause the acquire relay 47 to remain released as long as the local station remains off-hook and loop current continues to flow through the associated telephone instrument.

The station is released when the local instrument B is placed on-hook. Loop current ceases to flow through the loop current detector circuit 80. The acquire relay 47 operates in the station unit associated with telephone instrument B, with operation via the timer 81 and off-hook indicator circuit 82. Operation of acquire relay 47 opens the connection between instrument B, the high-impedance bridge circuit 121 and the voice line 46. Station unit B is now in a quiescent condition. However, since the central unit is sensitive only to the presence or absence of intercom loop current, the intercom circuit is held busy because intercom loop current continues to be drawn by the off hook called station C. The central unit 30 becomes idle only after last party release.

A local subscriber may pick up a call which has been placed on hold. More specifically, to acquire the central office line 25 (FIG. 1) when it is on hold, the subscriber at station C depresses the acquire line button 83 (FIG. 3). If the acquire relay 47 is already released because the intercom line is in a seized condition, depressing the acquire line button 83 has no effect on the acquire delay 47. If the relay is operated at the time, it releases when button 83 is pushed. The acquire line button 83 also causes the station unit to transmit a lengthened thirteenth data pulse to the central unit 30. Receipt of this long pulse in the central unit 30 (FIG. 2) causes the voice path switching relay 97 to release, thereby transferring the voice line 46 from the intercom talk battery source 107 to the central office line 25.

When the voice line 46 is disconnected from the intercom talk battery source 107, loop current is no longer drawn therefrom. The intercom loop current detector 109 begins transmitting an idle signal through the timer circuit 110 to the intercom status control logic 112. This idle signal is applied to circuit 60, and an idle intercom status signal is transmitted to all of the station units, in the form of an idle (short) fourth data pulse. The normal fourth data pulse is recognized in the station units 43 by circuit 114 (FIG. 3) as an idle indication. The intercom status lamps 53 are dark at all stations, to indicate that the intercom circuit is now idle. Also, the line acquire command circuit 93 (FIG. 2), activated by the depressed acquire line button at station C, as described earlier, causes the hold bridge and logic circuit 103 to reset and remove the hold coil from its connection across the central office line 25.

Any station that is connected to the central office line circuit includes means for preventing other stations, not connected to the central office line circuit, from being connected thereto. More particularly to exclude idle stations from joining the central office line circuit connection, a subscriber at any station already connected to the central office line circuit depresses the exclude button 122 on his station unit 43 (FIG. 3). Depressing the exclude button 122 causes the station unit 43 to lengthen the fifteenth pulse of each group in the data stream (FIG. 5). This wide or elongated pulse is transmitted to and decoded by the central unit 30. This time the exclude command circuit 91 in the central unit 30 responds to the long fifteenth pulse and drives the exclude control circuit 96 into an active state.

When in the active state, exclude control circuit 96 causes the time encoding logic/pulse group former circuit 60 to lengthen the second pulse of each group in the data stream. This data stream is transmitted over data line 45 and processed by all station units. Responsive thereto, an excluded command logic circuit 130 (FIG. 3) operates in each station unit 43, to disable the acquire line button 83 at all station units.

The active exclude control circuit 96 (FIG. 2) also causes the line acquire command circuit 93 to cause the line status circuit 98 to periodically lengthen the first pulse of each pulse group in the data stream. This periodically long first pulse causes the line status lamps 52 (FIG. 3) to flicker at all station units 43. A flickering line status lamp indicates that the central office line circuit is in the excluded mode. (The difference between a flashing lamp and a flickering lamp is determined by the percentage of pulses which are lengthened and the frequency of the lengthening.)

Central office line circuit release occurs when the telephone instrument is returned to an on-hook condition. Loop current stops flowing through the loop current detector circuit 80 in the station unit. After a period longer than a standard loop dial pulse, the timer 81 and off-hook indicator circuit 82 operate the acquire relay 47, thereby opening the connection between telephone instrument B and the voice line 46 to the central unit 30. At this time, the thirteenth data pulse of each pulse group in the data stream returns to an idle (short) length. Responsive to the short thirteenth data pulse, the line acquire command circuit 93 in the central unit 30 (FIG. 2) is no longer held busy. Hence, it resets, and, in turn, resets the line status circuit 98.

The first pulse of each pulse group in the data steam then reverts to an idle (short) length. The station unit 43 line status lamps 52 go dark responsive to the return of a short first pulse in each pulse group of the data stream. At this time the system is restored to its original idle condition, and ready for the next call.

Those who are skilled in the art will readily perceive how to modify the system. Therefore, the appended claims are to construed to cover all equivalent structures.

We claim:

1. A telephone system comprising a central unit and a plurality of station units interconnected by at least one transmission channel, means for transmitting a continuous data stream of cyclically recurring control pulses between said units via said transmission channel, said pulses being divided into uniformly recurring pulse groups with the pulse positions within each group identifying specific command functions, at least some of the pulse positions in each pulse group being dedicated to an identification of any selected one among said plurality of station units which is being individually commanded to perform certain ones of said functions identified by other pulse positions in each pulse group, and means in each of said units for exchanging switching and control information by distinctively modulating individual ones of the pulses in said pulse group according to the command functions embodied in said information, whereby either the individually-commanded station or a group of stations may perform the commanded functions.

2. The system of claim 1 wherein said transmission channel comprises a first channel means for transmitting voice signals and a second channel means for transmitting said data stream.

3. The system of claim 2 wherein each of said uniformly recurring pulse groups comprises sixteen pulses, one of said pulses being distinctively marked to provide for system synchronism.

4. The system of claim 3 wherein said distinctive marking is a deletion of said one pulse, whereby every sixteenth pulse in said data pulse stream is missing in order to synchronize the units of said system.

5. The system of claim 4 and means whereby the pulses in said pulse group have the following significance:

| Pulse Number | Significance |
| --- | --- |
| 0 | System Timing |
| 1 | Line Status |
| 2 | Excluded Line |
| 3 | Common Audible Signals Coupled Through Volume Control |
| 4 | Intercom Status |
| 5 through 8 | Intercom Station Address |
| 9 | Common Audible Signals Bypassing Volume Control |
| 13 | Line Status |
| 14 | Hold |
| 15 | Exclude |

6. The system of claim 2 wherein said transmission channel comprises four wires, said first channel including a first two of said four wires and said second channel comprising a second two of said four wires.

7. The system of claim 6 wherein each of said units is connected to said four wires whereby all of said units are connected in parallel.

8. The system of claim 7 wherein said central unit comprises a clock, means forming a source of said data stream of cyclically recurring control pulses, means for distributing said data stream of pulses over said second channel to all of said units, and means in each of said units for selectively modulating any of said pulses in said data stream, whereby all units detect said modulated pulses and are thereby made aware of a command represented by said modulated pulse.

9. The system of claim 8 wherein said modulated pulse is a pulse which persists for a longer duration than a non-modulated pulse.

10. The system of claim 1 and at least one alarm sensor means, means responsive to sensor means for modulating a selected pulse at a predetermined one of the pulse positions in each of said group of pulses, the predetermined one of the pulse positions being dedicated to the alarm condition signalled by said one sensor means, and means responsive to said modulation of said selected one pulse for sounding an alarm at each of said station units.

11. The system of claim 10 wherein there are a plurality of different types of said alarm sensors, and means whereby the sounding of said alarm distinctively corresponds to the type of sensor which triggers the alarm.

12. The system of claim 11 and means associated with some of said alarm sensor means for sounding an alarm with a controllable volume, and means associated with other of said alarm sensor means for sounding an alarm at full volume whereby a subscriber cannot control the alarm volume.

13. A telephone system comprising a central unit and a plurality of station units interconnected by four wires, two of which provide voice signal transmission and two of which provide control data transmission means for transmitting a continuous data stream of cyclically recurring clock pulses between said units via said control data transmission wires, said pulses being divided into uniformly recurring word groups, with some of the pulse positions within each group identifying specific command functions, and other of the pulse positions in each group identifying any selected one among said plurality of station units which is being commanded to perform the said functions identified by signals in said some pulse positions, and means in each of said units for exchanging switching and control information by distinctively modulating individual ones of the pulses in each of said word groups according to the command functions embodied in said information.

14. A telephone system comprising a central unit and a plurality of station units interconnected by at least one transmission channel, means for transmitting a continuous data stream of cyclically recurring control pulses between said units via said transmission channel, means for periodically deleting one pulse from said control pulse stream in order to divide said pulses into uniformly recurring pulse groups with the pulse positions within each group identifying specific command functions, means for distinctly modulating at least some of the pulse positions in each pulse group which are dedicated to an identification of any selected one among said plurality of station units whereby all of said station units may be interrogated as a group, means in each of said station units for exchanging switching and control information by distinctively modulating other of the pulses in said pulse group according to the command functions embodied in said information, and means in the station identified by the distinct modulation of the dedicated pulses for performing the said functions identified by said modulation of said other pulses in each pulse group.

* * * * *

UNITED STATES PATENT AND TRADEMARK OFFICE
CERTIFICATE OF CORRECTION

PATENT NO. : 4,097,690
DATED : June 27, 1978
INVENTOR(S) : Donald L. Kuntz; David Kent It is certified that error appears in the above-identified patent and that said Letters Patent are hereby corrected as shown below:

Col. 2, line 21, "voic-switched" should be --voice-switched--.

Col. 4, line 26, "46" should be --56--.

Col. 7, line 44, "Afer" should be --After--.

Col. 10, line 1, --be-- should be inserted between "to" and "construed".

Signed and Sealed this

Nineteenth Day of December 1978

[SEAL]

Attest:

RUTH C. MASON
Attesting Officer

DONALD W. BANNER
Commissioner of Patents and Trademarks